United States Patent [19]
Dailey et al.

[11] Patent Number: 5,170,623
[45] Date of Patent: Dec. 15, 1992

[54] HYBRID CHEMICAL/ELECTROMAGNETIC PROPULSION SYSTEM

[75] Inventors: Charles L. Dailey, Palos Verdes Estates; Ralph H. Lovberg, San Diego; Robert L. Sackheim, Rancho Palos Verdes; John J. Biess, Canoga Park, all of Calif.

[73] Assignee: TRW Inc., Redondo Beach, Calif.

[21] Appl. No.: 646,309

[22] Filed: Jan. 28, 1991

[51] Int. Cl.$^5$ .............................................. F02K 11/00
[52] U.S. Cl. .................................. 60/202; 60/39.462
[58] Field of Search ................... 60/200.1, 202, 203.1, 60/39.462

[56] References Cited

U.S. PATENT DOCUMENTS

| | | | |
|---|---|---|---|
| 3,041,824 | 7/1962 | Berhman | 60/202 |
| 3,143,851 | 8/1964 | Nyman | 60/202 |
| 3,173,248 | 3/1965 | Curtis et al. | 60/35.5 |
| 3,243,954 | 4/1966 | Cann | 60/35.5 |
| 3,293,852 | 12/1966 | Galli et al. | 60/202 |
| 3,318,094 | 5/1967 | Koller | 60/202 |
| 3,321,919 | 5/1967 | Marolda | 60/202 |
| 3,343,022 | 9/1967 | Eckert | 313/63 |
| 3,613,370 | 10/1971 | Paine | 60/202 |
| 3,735,591 | 5/1973 | Burkhart | 60/202 |
| 4,104,875 | 8/1978 | Birner et al. | 60/202 |
| 4,548,033 | 10/1985 | Cann | 60/203.1 |
| 4,577,461 | 3/1986 | Cann | 60/203.1 |
| 4,866,929 | 9/1989 | Knowles et al. | 60/202 |

OTHER PUBLICATIONS

C. L. Dailey et al., "Pulsed Inductive Thruster Component Technology," Final Report to the Air Force Astronautics Laboratory, Apr., 1987.

Primary Examiner—Louis J. Casaregola
Attorney, Agent, or Firm—James M. Steinberger; Sol L. Goldstein

[57] ABSTRACT

A hybrid chemical/electromagnetic propulsion system which combines thermal expansion of a chemically-reacted propellant with electromagnetic acceleration of the propellant to provide an efficient propulsion system that operates in the specific impulse $I_{sp}$ range of 800 to 2500 seconds. The hybrid chemical/electromagnetic propulsion system includes a reaction chamber, an expansion nozzle mounted to the exit of the reaction chamber, and an induction coil wound around a portion of the expansion nozzle. The reaction chamber supports the combustion or chemical reaction of a propellant to form high-temperature ionizable reaction products. The expansion nozzle then expands these high-temperature reaction products to generate thrust. The induction coil generates a varying electric and magnetic field which ionizes and magnetically accelerates the reaction products to generate additional thrust. A drive circuit supplies current to the induction coil in a manner that maximizes this additional thrust.

7 Claims, 1 Drawing Sheet

HYBRID CHEMICAL/ELECTROMAGNETIC PROPULSION SYSTEM

BACKGROUND OF THE INVENTION

This invention relates generally to rocket propulsion systems and, more particularly, to electric rocket propulsion systems.

Electric rocket propulsion systems are useful for a variety of space missions because of their high specific impulse $I_{sp}$ when compared to conventional chemical propulsion systems. Electric propulsion systems produce thrust by converting electrical energy directly into propellant kinetic energy, without necessarily raising the temperature of the propellant. In contrast, chemical propulsion systems produce thrust by converting chemical energy into heat, which is then converted into propellant kinetic energy by an expansion nozzle. As a result, the specific impulse $I_{sp}$ developed by chemical propulsion systems is limited by the temperature limitations of the nozzle and chamber wall materials, while the specific impulse developed by electrical propulsion systems is not. This allows electrical propulsion systems to develop a higher specific impulse than chemical propulsion systems.

However, electric propulsion systems have relatively low thrust-to-mass ratios and produce very low acceleration levels. Therefore, these systems cannot perform the initial launch function, but once launched into space by chemical propulsion systems, they can provide low acceleration levels continuously over long periods of time. Consequently, these systems are ideal for propelling spacecraft over very long distances or as thrusters for controlling and maneuvering spacecraft over extended periods of time.

Electric rocket propulsion systems employ either electrostatic or electromagnetic forces for generating thrust. Electrostatic propulsion systems generate thrust by ionizing a neutral propellant to form an ion source. The ions are then accelerated using electrostatic forces to produce a high velocity ion beam. An electromagnetic propulsion system generates thrust by ionizing a neutral propellant to form a plasma. Currents induced in the plasma interact with electromagnetic forces through a body or Lorentz force to accelerate the plasma. A third type of propulsion system, although not truly an electric propulsion system, is an electrothermal propulsion system, commonly referred to as an arcjet or plasma jet. An electrothermal propulsion system uses electrical power to heat a propellant to very high temperatures, and then accelerates the heated propellant in a conventional expansion nozzle.

However, none of these propulsion systems operates efficiently in the specific impulse $I_{sp}$ range of 800 to 2500 seconds, which is the preferred range for earth-orbit missions. Chemical propulsion systems are typically limited to a specific impulse $I_{sp}$ below this range and electrostatic propulsion systems are usually limited to a specific impulse $I_{sp}$ above this range. Electromagnetic and electrothermal propulsion systems operate in this range, but they are typically inefficient and require very high electrical power levels. Accordingly, there is a need for an efficient propulsion system that operates in the specific impulse $I_{sp}$ range of 800 to 2500 seconds. The present invention clearly fulfills this need.

SUMMARY OF THE INVENTION

The present invention resides in a hybrid chemical/electromagnetic propulsion system which combines thermal expansion of a chemically-reacted propellant with electromagnetic acceleration of the propellant to provide an efficient propulsion system that operates in the specific impulse $I_{sp}$ range of 800 to 2500 seconds. The hybrid chemical/electromagnetic propulsion system includes a reaction chamber, an expansion nozzle mounted to the exit of the reaction chamber, and an induction coil wound around a portion of the expansion nozzle. The reaction chamber supports the combustion or chemical reaction of a propellant to form high-temperature ionizable reaction products. The expansion nozzle then expands these high-temperature reaction products to generate thrust. The induction coil generates a varying electric and magnetic field which ionizes and magnetically accelerates the reaction products to generate additional thrust. A drive circuit supplies current to the induction coil in a manner that maximizes this additional thrust.

The high-temperature reaction products are ionized by the varying electric field to form a plasma. The varying electric field is oriented in a generally circular direction about the longitudinal axis of the expansion nozzle, thus inducing a circular flow of electrons in the plasma. The direction of this circulating current is opposite in direction to that of the circulating current in the induction coil. The varying magnetic field is oriented generally in the axial and radial directions relative to the longitudinal axis of the expansion nozzle, the magnitude of each component being a function of axial and radial position.

The circulating electrons in the plasma are accelerated by a Lorentz force $(j \times B)$, where j is the current density of the circulating current and B is the strength of the magnetic field. The Lorentz force is a body force which acts in a direction normal to the j and B vectors. Therefore, the radial component of the magnetic field and the circular current flow generate a Lorentz force which acts along the longitudinal axis of the expansion nozzle, causing the plasma to be accelerated out the expansion nozzle for the production of additional forward thrust.

The magnetic field generated by the induction coil is a time-varying field and, therefore, also operates in a the opposite direction to produce reverse thrust during a portion of each cycle. However, the drive circuit supplies current to the induction coil in a manner that maximizes forward thrust and minimizes this reverse thrust. The current cycle or waveform generated by the drive circuit is a damped sinusoidal oscillation having a short discharge period at relatively high current levels and a long charging period at relatively low current levels. This type of current waveform is important for two reasons. First, the electric field generated by the induction coil must be large in order to ionize the reaction products and generate the circulating current in the plasma. Second, the magnetic field generated by the induction coil must be large during the discharge portion of the cycle in order to maximize forward thrust and small during the charging portion of the cycle to minimize reverse thrust. With a symmetrical current waveform, no net thrust would be generated, since forward thrust would equal reverse thrust.

In the embodiment of the present invention, catalytic hydrazine is the preferred propellant since it is widely used in conventional chemical propulsion systems and it is readily ionized to form a plasma. The hybrid propulsion system of the present invention can operate either in a continuous mode, to produce thrust for long periods of time, or in a pulse mode, to produce thrust for short periods of time, such as a millisecond. The thrust of the hybrid propulsion system can be varied in flight by simply increasing or decreasing the propellant flow rate while holding the electric power constant.

It will be appreciated from the foregoing that the present invention represents a significant advance in the field of electric rocket propulsion systems. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
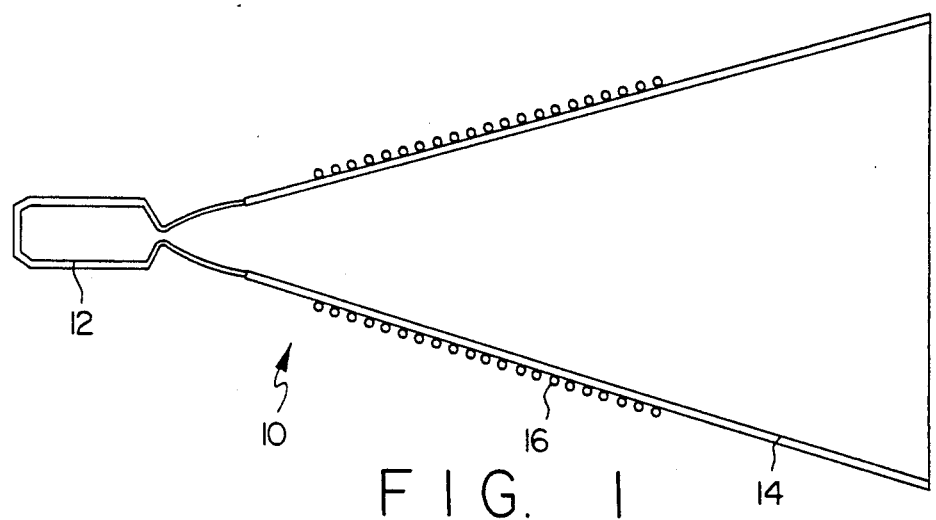
FIG. 1 is a schematic diagram of a hybrid chemical-/electromagnetic propulsion system in accordance with the present invention.

As illustrated in FIG. 1, a hybrid chemical/electromagnetic propulsion system 10 in accordance with the present invention includes a reaction chamber 12, an expansion nozzle 14 mounted to the exit of the reaction chamber 12, and an induction coil 16 wound around a portion of the expansion nozzle 14. The reaction chamber 12 supports the combustion or chemical reaction of a propellant to form high-temperature ionizable reaction products. The expansion nozzle 14 then expands these high-temperature reaction products to generate thrust. The induction coil 16 generates a varying electric and magnetic field which ionizes and magnetically accelerates the reaction products to generate additional thrust. A drive circuit 20, illustrated in FIG. 2, supplies current to the induction coil 16 in a manner that maximizes this additional thrust.

The high-temperature reaction products are ionized by the varying electric field to form a plasma. The varying electric field is oriented in a generally circular direction about the longitudinal axis of the expansion nozzle 14, thus inducing a circular flow of electrons in the plasma. The direction of this circulating current is opposite in direction to that of the circulating current in the induction coil 16. The varying magnetic field is oriented generally in the axial and radial directions relative to the longitudinal axis of the expansion nozzle 14, the magnitude of each component being a function of axial and radial position.

The circulating electrons in the plasma are accelerated by a Lorentz force ($j \times B$), where $j$ is the current density of the circulating current and $B$ is the strength of the magnetic field. The Lorentz force can also be viewed as a mutual repulsion between the current flowing in the induction coil 16 and the oppositely flowing current in the plasma. The Lorentz force is a body force which acts in a direction normal to the $j$ and $B$ vectors. Therefore, the radial component of the magnetic field and the circular current flow generate a Lorentz force which acts along the longitudinal axis of the expansion nozzle 14, causing the plasma to be accelerated out the nozzle for the production of forward thrust.

The magnetic field generated by the induction coil 16 is a time-varying field and, therefore, also operates in the opposite direction to produce reverse thrust during a portion of each cycle. However, the drive circuit 20 supplies current to the induction coil in a manner that maximizes forward thrust and minimizes this reverse thrust. Although the Lorentz force acts only on the electrons in the electrically neutral plasma, the ions are also accelerated along with the electrons because of an electric field that exists between the ions and the electrons which operates to prevent charge separation. In addition, the inward radial force on the plasma generated by the axial component of the magnetic field keeps the high temperature plasma away from the walls of the expansion nozzle 14, allowing the propellant temperature to exceed the maximum temperature limitation of the wall material.

Figure 2:
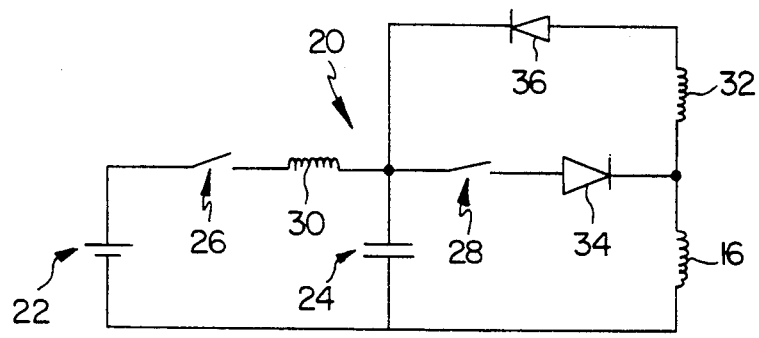
FIG. 2 is a circuit diagram of a drive circuit for supplying current to the hybrid propulsion system of the present invention.

The drive circuit 20, illustrated in FIG. 2, includes a power source 22, a storage capacitor 24, a charging switch 26, a discharge switch 28, a charging inductor 30, a return inductor 32, a forward-conducting discharge diode 34, and a reverse-conducting return diode 36. The charging switch 26, charging inductor 30, discharge switch 28 and forward-conducting discharge diode 34 are connected in series between the positive terminal of the power source 22 and a terminal of the induction coil 16, while the other terminal of the induction coil 16 is connected to the negative terminal of the power source 22. One terminal of the storage capacitor 24 is connected to the terminal between the charging inductor 30 and the discharge switch 28 and the other terminal of the storage capacitor 24 is connected to the negative terminal of the power source 22. The reverse-conducting return diode 36 and the return inductor 32 are connected in series and these two series-connected elements are connected in parallel with the discharge switch 28 and the forward-conducting discharge diode 34.

Figure 3:
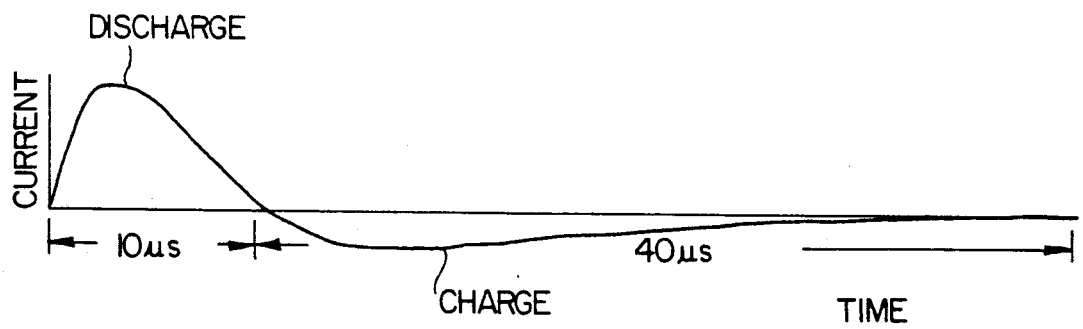
FIG. 3 is a graph of the current waveform generated by the drive circuit.

As illustrated in FIG. 3, the drive circuit 20 generates a current cycle or waveform which is a damped sinusoidal oscillation. The current cycle has a short discharge period at relatively high current levels and a long charging period at relatively low current levels. A typical current cycle has a discharge period of about 10 microseconds and a charging period of about 40 microseconds. When the discharge switch 28 is closed and the charging switch 26 is opened, current flows from the storage capacitor 24 through the discharge diode 34 to the induction coil 16, thus providing the discharge portion of the current cycle. Current cannot flow through the return inductor 32 because of the reverse-conducting return diode 36. When the discharge switch 28 is opened and the charging switch 26 is closed, current returns to the storage capacitor 24 through the return inductor 32 and return diode 36, thus providing the charging portion of the current cycle. Current can only return to the storage capacitor 24 through the return inductor 32 because of the forward-conducting discharge diode 34 and the discharge switch 28.

The shape of the current waveform, which is controlled by selecting the inductance of the return inductor 32 to be much larger than the inductance of the induction coil 16, is important for two reasons. First, the electric field generated by the induction coil 16 must be large in order to ionize the reaction products and generate the circulating current in the plasma. Since the magnitude of the electric field is proportional to the rate of change of current (di/dt) in the induction coil 16, a rapid and large change in current is required. In the current waveform illustrated in FIG. 3, the discharge portion of the current cycle has a very fast current rise time of about 2 to 3 microseconds.

Second, the magnetic field generated by the induction coil 16 must be large during the discharge portion of the cycle in order to maximize forward thrust and small during the charging portion to minimize reverse thrust. With a symmetrical current waveform, no net thrust would be generated, since forward thrust would equal reverse thrust. The strength of the magnetic field is proportional to the current squared, so if the current is reduced during the charging portion of the cycle by ¼ compared to the discharge portion, for example, the magnetic force in the reverse thrust direction is 1/16 that of the magnetic force in the forward thrust direction. The result is a net forward force of 15/16 (1−1/16). However, the area under the two curves must be equal since the current integrated over time is the charge stored by the capacitor 24. Therefore, the duration of the charging period must be correspondingly longer than the discharge period.

In the embodiment of the present invention, catalytic hydrazine is the preferred propellant since it is widely used in conventional chemical propulsion systems and it is readily ionized to form a plasma. Catalytic hydrazine is a monopropellant which requires a catalyst bed to initiate the exothermic chemical reaction. However, the propellant can also be any other monopropellant or bipropellant that forms ionizable reaction products.

The shape of the expansion nozzle 14 of the present invention must be optimized to provide maximum conversion of thermal energy into kinetic energy. Preferably, the ratio of the exit area of the expansion nozzle 14 to its throat area is greater than 100 and the ratio of its length to diameter is greater than 10. The expansion nozzle 14 must also be a nonconductor, such as ceramic, in order to not interfere with the electric and magnetic fields generated by the induction coil 16. By using a high frequency current waveform, on the order of a kilohertz, and an expansion nozzle 14 with the above preferred dimensions, several cycles of electromagnetic acceleration can be imparted to the plasma before it leaves the nozzle.

The hybrid propulsion system of the present invention can operate either in a continuous mode, to produce thrust for long periods of time, or in a pulse mode, to produce thrust for short periods of time, such as a millisecond. The thrust of the hybrid propulsion system can be varied in flight by simply increasing or decreasing the propellant flow rate while holding the electric power constant.

From the foregoing, it will be appreciated that the present invention represents a significant advance in the field of electric rocket propulsion systems. The hybrid propulsion system of the present invention operates in the desirable specific impulse $I_{sp}$ range of 800 to 2500 seconds, is efficient at moderately low power levels, and is ideally suited for satellite deployment, maintenance and retrieval, as well as orbital propulsion. Although a preferred embodiment of the invention has been shown and described, it will be apparent that other adaptations and modifications can be made without departing from the spirit and scope of the invention.

Accordingly, the invention is not to be limited, except as by the following claims.

We claim:

1. A hybrid chemical/electromagnetic propulsion system, comprising:
    a reaction chamber for supporting a chemical reaction of a propellant to form high-temperature ionizable reaction products;
    an expansion nozzle mounted to the reaction chamber for expanding the high-temperature reaction products to generate thrust; and
    an induction coil wound around a portion of the nozzle for generating a varying electric and magnetic field which ionizes and magnetically accelerates the reaction products to generate additional thrust.

2. The hybrid chemical/electromagnetic propulsion system as set forth in claim 1, and further including a drive circuit for supplying a varying current to the induction coil, the drive circuit generating a current cycle having a short discharge period at high current levels and a long charging period at low current levels to maximize ionization and forward thrust.

3. The hybrid chemical/electromagnetic propulsion system as set forth in claim 1, wherein the varying electric field is oriented in a generally circular direction about the longitudinal axis of the expansion nozzle, thus inducing a circular flow of electrons in the ionized reaction products, and wherein one component of the varying magnetic field is oriented generally in the radial direction about the longitudinal axis of the expansion nozzle, thus causing the circulating electrons to be accelerated by a Lorentz force (j×B), where j is the current density of the circulating current and B is the strength of the magnetic field.

4. The hybrid chemical/electromagnetic propulsion system as set forth in claim 2, wherein the drive circuit includes:
    a charging switch;
    a charging inductor having a terminal connected to a terminal of the charging switch;
    a discharge switch having a terminal connected to the other terminal of the charging inductor;
    a forward-conducting discharge diode having a positive and negative terminal, the positive terminal being connected to the other terminal of the discharge switch;
    a storage capacitor having a terminal connected to the terminal between the charging inductor and the discharge switch;
    a reverse-conducting return diode having a positive and negative terminal, the negative terminal being connected to the terminal between the charging inductor and the discharge switch;
    a return inductor having a terminal connected to the positive terminal of the return diode and the other terminal connected to the negative terminal of the discharge diode;
    wherein the negative terminal of the discharge diode is connected to a terminal of the induction coil, the other terminal of the induction coil and the other terminal of the storage capacitor are connected to the negative terminal of a power source, and the other terminal of the charging switch is connected to a positive terminal of the power source;
    wherein current flows from the storage capacitor through the discharge diode to the induction coil when the discharge switch is closed and the charging switch is opened, thus providing the discharge portion of the current cycle, and current returns to the storage capacitor through the return inductor and return diode when the discharge switch is opened and the charging switch is closed, thus providing the charging portion of the current cycle.

5. The hybrid chemical/electromagnetic propulsion system as set forth in claim 4, wherein the inductance of the return inductor is selected to be much larger than the inductance of the induction coil.

6. The hybrid chemical/electromagnetic propulsion system as set forth in claim 1, wherein the expansion nozzle is fabricated from a nonconductor.

7. The hybrid chemical/electromagnetic propulsion system as set forth in claim 1, wherein the propellant is catalytic hydrazine.

* * * * *